United States Patent [19]
Thevenin

[11] Patent Number: 5,640,017
[45] Date of Patent: Jun. 17, 1997

[54] REMOTE RADIATION DETECTION DEVICE WITH INORGANIC SCINTILLATING DETECTING CRYSTAL AND FIBER OPTIC

[75] Inventor: Jean-Claude Thevenin, Velizy, France

[73] Assignee: Commissariat a l'Energie Atomique, Paris, France

[21] Appl. No.: 421,246

[22] Filed: Apr. 13, 1995

[30] Foreign Application Priority Data

Apr. 19, 1994 [FR] France .................. 94 04641

[51] Int. Cl.[6] .................. G01T 1/20; G01N 21/64; G01J 1/58
[52] U.S. Cl. .................. 250/368; 250/361 R; 250/367; 250/483.1; 250/485.1; 250/487.1
[58] Field of Search .................. 250/361 R, 366–368, 250/483.1, 485.1, 487.1, 370.11; 385/126–127, 31

[56] References Cited

U.S. PATENT DOCUMENTS

| | | | |
|---|---|---|---|
| 4,631,409 | 12/1986 | Sparacia et al. | 250/368 |
| 4,658,141 | 4/1987 | Wilt et al. | 250/368 |
| 4,788,436 | 11/1988 | Koechner | 250/485.1 |
| 4,829,180 | 5/1989 | Goto et al. | 250/586 |
| 4,935,632 | 6/1990 | Hart | 250/487.1 |
| 5,030,834 | 7/1991 | Lindmayer et al. | 250/368 |
| 5,061,855 | 10/1991 | Ryuo et al. | 250/487.1 |
| 5,168,540 | 12/1992 | Winn et al. | 385/128 |
| 5,308,986 | 5/1994 | Walker | 250/370.11 |
| 5,391,878 | 2/1995 | Petroff | 250/367 |
| 5,434,415 | 7/1995 | Terada et al. | 350/368 |

FOREIGN PATENT DOCUMENTS 0107532  5/1984  European Pat. Off. .

OTHER PUBLICATIONS

Radecs '93, Sep. 13–16 1993, "Scintillating Fibre Detector System for Spacecraft Dosimetry", C.P.W. Boeder, et al, 4 pages.
Sensys (Sensor Systems), "Fibre-Optic Nuclear Detector System", pp. 1–5.

Primary Examiner—Frank G. Font
Assistant Examiner—Jason D. Vierra Eisenberg
Attorney, Agent, or Firm—Oblon, Spivak, McClelland, Maier & Neustadt, P.C.

[57] ABSTRACT

Device for the remote detection of radiation.

This device has an optical fibre (4), a detecting crystal (10), whereof one end is optically coupled to the optical fibre and which is able to emit, by interacting with the radiation (2), a light which then propagates in the optical fibre, as well as an optical cladding (12) surrounding the detecting crystal and which is in optical contact therewith and whose optical index is lower than that of the detecting crystal, so as to confine said light by total reflection. Application to dosimetry.

12 Claims, 1 Drawing Sheet

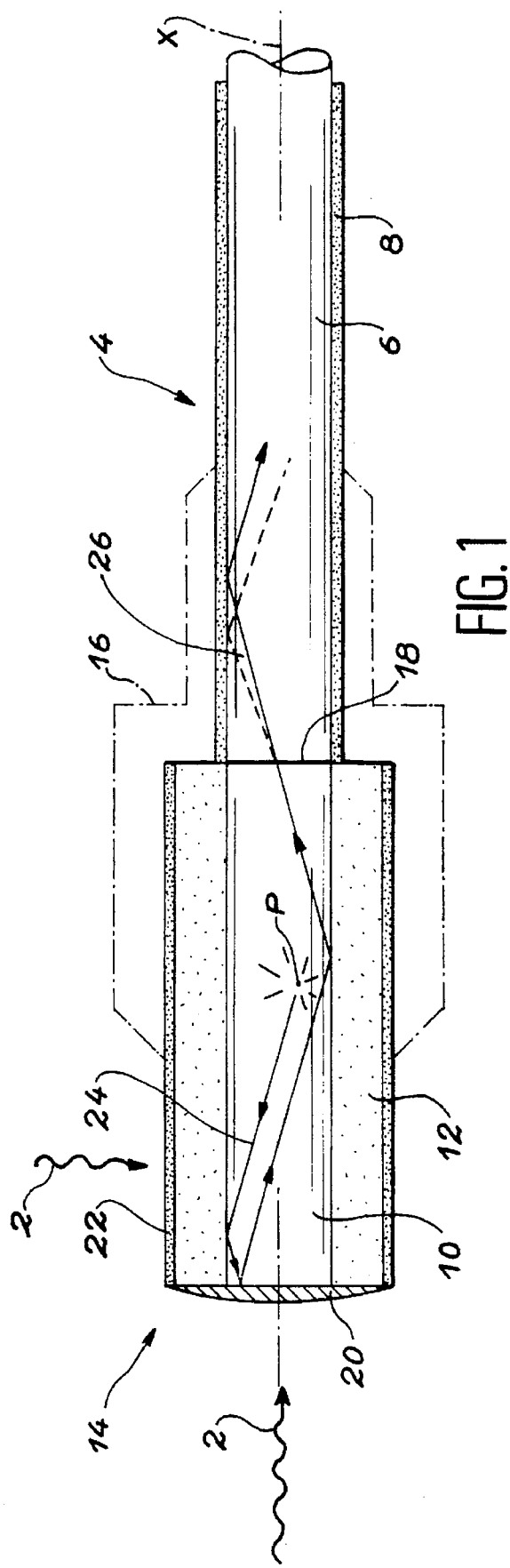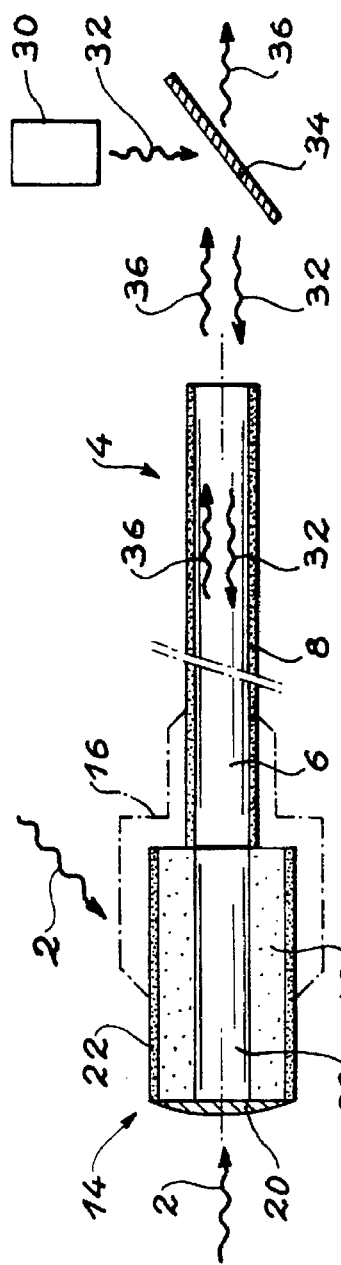

REMOTE RADIATION DETECTION DEVICE WITH INORGANIC SCINTILLATING DETECTING CRYSTAL AND FIBER OPTIC

BACKGROUND OF THE INVENTION

1. Field of the Invention

The present invention relates to a device for the remote detection of radiation It in particular applies to dosimetry and more specifically to microdosimetry.

2. Description of the Prior Art

In order to perform a remote measurement of a radiation, such as a X or gamma radiation, it is known to use an optical fibre at one end of which is placed an element able to emit light in the presence of the radiation.

In this way the radiation is detected by the interaction thereof with the material constituting the elements traversed by the said radiation The lower the material quantity intervening in the detection, the lower the potential sensitivity of the thus obtained detector.

Thus, the energy deposited by the radiation is expressed in joules per kilogram of material. For a given emitter, the luminescence produced is proportional to the deposited energy.

For a crystal such as NaI, it is necessary to deposit there approximately 25 eV in order to produce a photon, whose wavelength is approximately 410 µm.

Thus, for a given dose measurement, when the mass decreases, the corresponding energy decreases and the same applies with respect to the brightness and consequently the sensitivity.

The lowest detectable dose corresponds to the sensitivity threshold of the light detector (e.g. a photomultiplier). A photomultiplier having a 20% photocathode quantum efficiency will detect a minimum pulse signal of about 10 photons of 2 to 3 eV (reaching its entrance window).

The measured deposited energy is dependent on the minimum energy deposited by each particle and the number of particles converted in the detecting element. If the mass of the detector decreases, the detectable dose threshold increases.

An optical fibre has the advantage of being able to transmit light over considerable distances with low energy losses.

The use of an optical fibre imposes a certain number of constraints, which affect the sensitivity of the associated detector.

Moreover, the coupling of a material with an optical fibre introduces two limitations, namely a dimensional limitation, bearing in mind the diameter of the optical fibre core, and an angular limitation imposing that the collected light is accepted by the optical fibre bearing in mind its numerical aperture. Consequently the optical fibre limits the material quantity producing light accepted and transmitted by said fibre.

Thus, the light collected by the optical fibre is a function of said numerical aperture, the distance between the production point of said light and the corresponding end of the fibre and the distance from said point to the axis of said fibre Thus, e.g. in the case of a silica optical fibre (optical index approximately 0.27) and a detecting crystal optically coupled to said fibre and whose dimensions, taken perpendicularly to the axis thereof, are large compared with those of the fibre, also taken perpendicular to said axis, the light produced by the interaction of radiation with the crystal is not accepted in the full angular aperture of the fibre unless it is produced in the immediate vicinity of the end thereof.

The light quantity accepted by the fibre decreases rapidly when the point at which said light is produced is beyond a distance of approximately 0.5 to 1 mm from the corresponding end of the fibre.

A known optical radiation detector is constituted by an inorganic scintillator optically coupled to a photomultiplier. In order to obtain such a detector, a large diameter block of said inorganic scintillator is placed in front of the photomultiplier photocathode.

In this case, the problem of the collection of the light resulting from the interaction of the radiation with the scintillator is solved by placing said scintillator block in a box, whose inner face is coated with a high albedo diffusing or reflecting deposit (e.g. a MgO layer).

Thus, the collection of light causes no problems in the case of a detecting crystal coupled to a photomultiplier if the thickness of said crystal is roughly equal to or smaller than the transverse dimensions of said crystal, said transverse dimensions being approximately equal to the diameter of the photocathode of the photomultiplier.

However, the collection of the light produced in a detecting crystal by an optical fibre coupled to said crystal causes a problem, as stated hereinbefore, because the dosimetric measuring signal, which is the light signal transmitted by the fibre, decreases rapidly when the light is produced beyond a relatively small distance from the corresponding end of the fibre.

For the detection of radiation by means of optical fibres, it is known to use scintillating, plastic, optical fibres from the following document:

(1) EP-A107 532 corresponding to U.S. Pat. No. 4,552, 431.

A use of such scintillating optical fibres in dosimetry is described in the following document:

(2) "Scintillating fibre detector system for spacecraft dosimetry", C. P. W. Boeder, L. Adams and R. Nickson, RADEC '93, Saint Malo, France, 13–16 September 1993.

Reference can also be made in this connection to the following document:

(3) "Fibre-optic nuclear detector system", technical description, production version 1993-FND-C2, SEN-SYS (Sensor System) P.O. Box 411 2200AK NOORDWIJK, The Netherlands.

Document (1) describes processes for producing scintillating optical fibres having a polystyrene core. These fibres are used in large particle detectors, generally for locating charged particles (such as electrons, protons and π mesons) and also in $e^-$, γ power calorimeters having a high spatial resolution and a high energy resolution. These calorimeters are constituted by alternate layers of fibres and an absorbent element, which converts the incident radiation.

Documents (2) and (3) describe a high resolution dosimetry apparatus using approximately 10 cm of a scintillating optical fibre of the type referred to in document (1).

This polymeric material, scintillating optical fibre has a very low capacity for interaction and conversion of the energy of the γ photons. It is therefore placed in a thin, aluminium metallic cylinder, which serves as the radiation converter.

The light emitted by the scintillating fibre under the effect of ionizing radiation is then transmitted by an undoped optical fibre, which also has a polystyrene core, to a GaAsP semi-conductor detector having a very low dark current.

Another dosimetry apparatus is mentioned in the following document:

(4) U.S. Pat. No. 5,030,834 (Lindmayer et al).

This document relates to a dosimetric measuring apparatus, whereof the sensitive element is a doped strontium sulphide block having luminescence properties. It is a question of optically stimulated luminescence, This block, which has a side length of a few millimeters, is placed at the end of a silica optical fibre with a diameter of 0.2 mm.

The doped material used contains elements such as samarium or europium, which have metastable levels. These storage levels, under the effect of the radiation, are stored in proportion to the dose received.

The light emission of a YAG laser, supplied to the SrS block by means of the optical fibre, by emptying said storage levels makes it possible to stimulate a light emission, which is proportional to the dose received.

In documents (2) and (3) it is a question of a plastic optical fibre guided structure. However, plastic materials have mediocre properties for detecting gamma radiation. It is generally preferable for gamma radiation detection purposes to use inorganic crystals of higher atomic number Z such as NaI or BGO crystals.

In the case of document (4), the material used is able to detect gamma radiation. However, the effective volume, which produces the light accepted by the optical fibre, is very limited. This corresponds to the disadvantage referred to hereinbefore.

Thus, no matter what the size of the SrS crystal placed at the end of the optical fibre, the effective volume is limited, on the one hand due to the fact of the diameter of the optical fibre (200 µm) and on the other in thickness, due to the limitation to the numerical aperture.

For example, for a fibre with a diameter of 200 µm and an aperture of ±15° (silica/silicone fibre), the collected light decreases rapidly for distances to the fibre entrance face exceeding 0.8 mm.

Dosimetric detectors are also known which comprise optical fibres, but which do not use luminescence phenomena. These dosimetric detectors use the absorption induced in the optical fibres by structural modifications created by the radiation.

Such detectors are less sensitive, require greater fibre lengths and operate in accordance with an accumulation principle, which makes it necessary to frequently replace the optical fibres. Moreover, limited heat recovery effects, optionally at ambient temperature, disturb the accuracy of the measurements.

SUMMARY OF THE INVENTION

The object of the present invention is to obviate the disadvantages of the known detection devices referred to hereinbefore by proposing a remote radiation detection device having a detecting crystal made from an inorganic material and associated with an optical fibre and whose detection efficiency remains at its maximum value over the entire crystal length and which is now only limited by the numerical aperture of the optical fibre.

BRIEF DESCRIPTION OF THE DRAWINGS

FIG. 1 A diagrammatic, partial view of an embodiment of the device according to the invention comprising a detecting crystal made from an inorganic scintillating material.

FIG. 2 A diagrammatic, partial view of another embodiment of the device according to the invention, whose detecting crystal is made from a material having optically stimulatable luminescence.

DESCRIPTION OF THE PREFERRED EMBODIMENTS

More specifically, the present invention relates to a remote radiation detection device comprising an optical fibre and a detecting crystal made from an inorganic material, whereof one end is optically coupled to the optical fibre and which is able to emit, by interaction with the radiation, a light which then propagates in the optical fibre, said device also having an optical cladding surrounding the detecting crystal, which is in optical contact therewith and whose optical index is lower than that of the detecting crystal, so as to confine said light by total reflection at the interface between the detecting crystal and the optical cladding.

Admittedly document (5) U.S. Pat. No. 4,788,436 (W. Koechner) discloses a radiation detection device comprising an optical fibre, whose core is made from a plastic scintillating material and which is optically coupled to a glass core fibre. However, in the present invention, use is made in the form of an optically guided structure of an inorganic material having, for the same volume, a greater interaction capacity with a radiation than plastic scintillating materials.

According to an embodiment of the device according to the invention, the dimension of the detecting crystal, calculated along the optical fibre axis, exceeds the dimensions of said detecting crystal, calculated perpendicular to said axis.

According to a preferred embodiment of the device according to the invention, the dimensions of the detecting crystal, calculated perpendicular to the optical fibre axis, are substantially equal to those of the core of said optical fibre, calculated perpendicular to said axis.

The light collected by the optical fibre then exceeds what its level would be if the dimensions of the detecting crystal exceeded those of the optical fibre core.

Preferably, the respective optical indices of the detecting crystal and the optical cladding are chosen in such a way that the numerical aperture of the detecting crystal provided with said cladding is slightly smaller than that of the optical fibre.

As will be shown hereinafter, this makes it possible to reduce the risks of disturbing the light signal recovered by the fibre by variations in the curvature of said fibre.

It is also preferable for the outer wall of the optical cladding to be covered with a layer able to absorb the light produced by the interaction of the radiation with the detecting crystal.

In order to further increase the sensitivity of the device according to the invention, it is also preferable to cover the end of the detecting crystal, opposite to that which is optically coupled to the optical fibre, with a layer able to reflect said light.

The detecting crystal can be made from an inorganic scintillating material This inorganic scintillating material can be chosen from within the group including bismuth germinate, sodium iodide, calcium tungstate, cadmium tungstate, cesium fluoride, calcium fluoride and lithium iodide.

As a variant, the detecting crystal can be made from an inorganic material with optically stimulatable luminescence. This material having optically stimulatable luminescence can be chosen from within the group including doped sulphides, doped silica, doped oxide such as doped germium oxide, doped optical glasses and doped fluoride glasses, doping taking place with the aid of rare earths.

The optical cladding can be made from a material chosen from within the group including silica, silica-based glasses, organic glasses, fluoride glasses, chalcogenide glasses and polymer materials.

The invention is described in greater detail hereinafter relative to non-limitative embodiments and the attached drawings, wherein show:

FIG. 1 diagrammatically and partly shows a device according to the invention permitting the remote detection of a radiation 2, such as e.g. X or γ radiation.

The device of FIG. 1 has an optical fibre 4, whose core and optical cladding respectively carry the references 6 and 8. The optical fibre 4 has a large numerical aperture, e.g. approximately 0.43 (±25°).

The device of FIG. 1 also has a detecting crystal 10, whereof one end is optically coupled to the optical fibre 4.

The device of FIG. 1 also has an optical cladding 12 surrounding the detecting crystal 10, which is in optical contact therewith and whose optical index is lower than that of the detecting crystal.

This detecting crystal 10 is made from an inorganic material, which strongly absorbs the incident radiation and which from this standpoint is more favourable than a plastics material. The detecting crystal 10 is able to emit, by interaction with the incident radiation 2, a light which then propagates in the optical fibre 4.

The detection element 14 formed by the detecting crystal 10 and the optical cladding 12 associated therewith makes it possible to confine, by total reflection at the interface between the detecting crystal 10 and the optical cladding 12, the light resulting from said interaction and which is included in the solid angle accepted by the optical fibre.

In the case of FIG. 1, the detecting crystal 10 is shaped like a bar, whose transverse dimensions, calculated perpendicular to the axis X of the end of the fibre 4 with which said bar is optically coupled, are substantially equal to those of the core of the optical fibre 4 also calculated perpendicular to the axis X Use is e.g. made of an optical fibre having a symmetry of revolution about the axis X and a bar also having a symmetry of revolution about said axis X and having substantially the same radius as the core of the fibre 4, said radius being much smaller than the length of the bar (calculated parallel to the axis X).

Thus, more light is collected with the optical fibre 4 than if the bar had transverse dimensions greater than those of the fibre.

By means of the cladding 12, the detecting element 14 makes it possible to maintain substantially constant the light quantity collected by the optical fibre 4 over the entire detection length, which is the length of the detecting crystal 10.

In other words, to within the optical absorption of the material, said collected light quantity remains constant no matter what the position of the point P of the detecting crystal 10 and namely the point at which is emitted the light by the interaction of the crystal with the radiation.

Thus, a detection device is provided having a good sensitivity for dosimetry, i.e. having an adequate effective mass, due to the constituent material of the detecting crystal, the large aperture of the optical fibre and the optical cladding.

In the embodiment of FIG. 1, the detecting crystal 10 is made from a scintillating inorganic material such as e.g. bismuth germanate, sodium iodide, calcium tungstate, cadmium tungstate, cesium fluoride, calcium fluoride or lithium iodide.

The optical cladding 12, which constitutes a transparent tube having a lower optical index than that of the detecting crystal 10 and which is in optical contact with the latter, is made from a material whose physical and thermal properties are chosen as a function of those of the material forming the detecting crystal 10.

It is e.g. possible to use an optical cladding made from silica, silica-based glass, organic glass, fluoride glass, chalcogenide glass or a polymer material.

The end of the optical fibre 4 can be fixed to the detecting element 14 by appropriate mechanical means 16 or with the aid of an optical glue layer 18 located at the interface between the detecting crystal 10 and the fibre 4, as can be seen in FIG. 1. This glue serves both to fix the detecting element to the fibre and to ensure the optical coupling between the detecting crystal 10 and the fibre core 6.

It is advantageous to have a layer 20 able to reflect the light produced by the interaction of the crystal with the radiation, at the end of the detecting element 14, opposite to that which is coupled to the optical fibre 4, as can be seen in FIG. 1. This makes it possible to virtually double the light quantity collected by the optical fibre 4 and to thus increase the sensitivity of the detection device. The layer 20 is e g. a vacuum-deposited, 100 nm aluminium layer.

It should be noted that if use was made of a cubic detecting crystal having e.g. a side length of 2 mm in place of the bar 10 at the end of the optical fibre 4, the use of such a reflecting layer would be virtually ineffective.

It is preferable to choose the optical index of the detecting crystal 10 and the optical index of the cladding 12 associated therewith in such a way that the numerical aperture of the detecting element 14 is slightly below that of the optical fibre 4, In this case, the light transmission takes place on this side of the limiting total reflection angle of the optical fibre 4.

Thus, there is a reduction in the risks of disturbing the light signal transmitted by the fibre by variations in the curvature of said fibre.

It is also advantageous to cover the outer wall of the optical cladding 12 with a layer 22 able to absorb the light emitted by interaction of the crystal with the radiation, in angles exceeding the aperture determined by the total reflection limiting angle on the face common to the crystal and to its optical cladding.

FIG. 1 shows a point P in which a radiation has interacted with the detecting crystal and a light ray 24 resulting from said interaction, which then reflects at the interface between the detecting crystal 10 and the cladding 12, followed by at the reflecting layer 20 and then again at the interface between the crystal and the cladding 12 and which subsequently passes into the core of the fibre 4 (it has been assumed in the embodiment shown that the optical index of the fibre core 6 is equal to that of the crystal 10) and is then propagated in said fibre 4.

In broken line form is shown the limiting total reflection angle 26 of the fibre 4 and it is possible to see, in the case of FIG. 1, that the limiting total reflection angle relative to the detecting element 14 is lower than said limiting angle 26.

The device according to the invention diagrammatically and partially shown in FIG. 2 differs from that of FIG. 1 in that, in the detecting element 14 of the device of FIG. 2, the detecting crystal 28 is made from an inorganic material having optically stimulated luminescence.

In order to stimulate said luminescence, use is made of a source 30 of stimulation radiation 32 and a dichroic mirror 34 permitting the injection of said stimulation radiation 32 into the end of the optical fibre 4 opposite to that optically coupled to the detecting crystal 28. Thus, when a radiation 2 to be detected interacts with the detecting crystal 28, a visible light 36 is emitted by said detecting crystal 28 stimulated by the radiation 32 and said light 36 passes into the optical fibre 4 in order to then traverse the dichroic mirror (which is provided for reflecting at least partly the radiation 32 and leaving at least in part the light 36).

The optically stimulatable luminescence material can e.g. be constituted by doped sulphides or doped glasses (silica, oxide such as e.g. germanium oxide, optical glasses, fluoride glasses). The dopants can be chosen from within the group of rare earths.

The elements having metastable energy levels can be samarium or europium.

For example use is made of an optical fibre having a core with a diameter of 200 μm or 1 mm and with which is associated a SrS bar (material mentioned in document (4)) and said bar is inserted in a silica tube, with an internal diameter of 200 μm or 1 mm and which is optically coupled to said fibre.

In this case, by abstracting the inherent absorption of the material constituting the bar, the detection efficiency remains at the maximum value (limited by the numerical aperture of the optical fibre) over the entire bar length.

The sensitivity gain of such a radiation detection device compared with the device proposed in document (4) is proportional to the useful length (bar length). A length of approximately 10 mm leads to a gain of more than an order of magnitude as regards sensitivity compared with the device described in document (4).

A device according to the invention can be manufactured by using a tube having a high melting point, e.g. of silica, which is immersed in a molten scintillating material bath. The latter is then crystallized, which leads to a detecting element and this is followed by the removal of the scintillating material located on the outer wall of the silica tube.

It is possible to manufacture a device according to the invention comprising an inorganic scintillating material bar NaI(Tl), CsI, BGO) with a small diameter of e.g. 200 to 1000 μm. Such a device constitutes a very interesting detector for optical fibre dosimetry.

At the 1 mm scale, the contraction problems due to the production of crystals in situ in tubes and at high temperatures are minimized. The optical contact between a bar constituting the detecting crystal and the associated optical cladding is maintained.

It is preferable to choose for said crystal and said cladding materials having neighbouring thermal expansion coefficients.

It is possible to obtain a detecting crystal in an optical cladding by an injection, pressure or drawing process if the constituent material of the detecting crystal is able to withstand melting (followed by cooling) without any loss of its properties.

The material forming the optical cladding can be silica or glass having an appropriate optical index, as well as mechanical and thermal properties chosen as a function of the characteristics of the detecting crystal which it is wished to associate therewith.

As a result of their higher density, inorganic scintillating crystals have a better gamma radiation detection capacity than organic scintillators. This is very important in the case where it is wished to detect natural radiation by means of a detecting crystal, whose two dimensions have already been imposed by the diameter of the optical fibre which it is wished to associate therewith.

For the same traversed material length, the deposited energy is higher (for electrons the energy deposit per centimeter is 2.5 times higher for NaI than for a plastic scintillating material) and the luminous efficiency, for the same deposited energy, is four times higher It should be noted that the optical cladding associated with the detecting crystal also constitutes a protection, e.g. with respect to moisture The performance characteristics of a detecting device according to the invention are very superior to those of known devices comprising optical fibres, as a result of the use of the optical cladding around the detecting crystal.

The invention makes it possible to achieve dose measurement sensitivities of approximately 10 μSv/h or 1 μSv/h, which makes it possible to use the same for carrying out measurements which are impossible using the known devices.

It is e.g. possible to perform real time dosimetric measurements for workers in the nuclear field, e.g. at particularly exposed extremities such as the hands and feet and also with respect to sensitive organs.

Moreover, the transmission of the measurement signal by optical fibre gives access to a real time information on the dose received and therefore permits the following of the evolution of the risk during working.

In addition, due to the networks of optical fibres, devices according to the invention can be used for remote monitoring of sites and a large number of measuring points can be associated with a single information processing system, which generally represents the most expensive part of a measuring equipment.

I claim:

1. Remote radiation detection device comprising a transmission optical fiber and a detecting crystal made from an inorganic material, wherein said detecting crystal is a unitary solid and is optically coupled directly to the transmission optical fiber, wherein said detecting crystal is able to emit, by interaction with radiation, light which propagates in the optical fiber, and wherein said detecting crystal is shaped such that the dimension of the detecting crystal along the axis of the optical fiber exceeds the dimensions of the detecting crystal perpendicular to said axis, said device also having an optical cladding surrounding the detecting crystal, which cladding is in optical contact therewith and whose optical index is lower than that of the detecting crystal, so as to confine said light by total reflection at the interface between the detecting crystal and the optical cladding.

2. Device according to claim 1, characterized in that the dimensions of the detecting crystal calculated perpendicular to the axis (X) of the optical fibre, are substantially equal to those of the core of said optical fibre, calculated perpendicular to said axis.

3. The device as claimed in claim 2 wherein said transmission optical fiber does not penetrate into said detecting crystal.

4. Device according to claim 1, characterized in that the respective optical indices of the detecting crystal and the optical cladding are chosen in such a way that the numerical aperture of the detecting crystal provided with said optical cladding is slightly below that of the optical fibre.

5. Device according to claim 1, characterized in that the outer wall of the optical cladding is covered with a layer able to absorb said light.

6. Device according to claim 1, characterized in that the end of the detecting crystal opposite to that optically coupled to the optical fibre is covered with a layer able to reflect the said light.

7. Device according to claim 1, characterized in that the detecting crystal is made from a scintillating inorganic material.

8. Device according to claim 7, characterized in that the scintillating inorganic material is chosen from within the group including bismuth germanate, sodium iodide, calcium tungstate, cadmium tungstate, cesium fluoride, calcium fluoride and lithium iodide.

9. Device according to claim i, characterized in that the detecting crystal is made from an inorganic material with optically stimulatable luminescence.

10. Device according to claim 9, characterized in that the optically stimulatable luminescence material is chosen from within the group including doped suphides, doped silica, doped oxide such as doped germanium oxide, doped optical glasses and doped fluoride glasses, doping taking place with the aid of rare earths.

11. Device according to claim 1, characterized in that the optical cladding is made from a material chosen from within the group including silica, silica-based glasses, organic glasses, fluoride glasses chalcogenide glasses; and polymer materials.

12. The device as claimed in claim 1, consisting of said transmission optical fiber, said detecting crystal and said optical cladding.

* * * * *